United States Patent [19]

Iiskola et al.

[11] Patent Number: 5,869,418
[45] Date of Patent: Feb. 9, 1999

[54] STEREOSPECIFIC CATALYST SYSTEM FOR POLYMERIZATION OF OLEFINS

[75] Inventors: Eero Iiskola, Porvoo; Paivi L. Pitkanen, Halkia; Timo Leinonen, Tolkkinen; Jukka Tulisalo, Kerava; Mika Harkonen, Vantaa; Ann Britt Bjaland, Porvoo; Tarja Soderberg, Porvoo; Pirjo Jaaskelainen, Porvoo, all of Finland

[73] Assignee: Borealis Holding A/S, Lyngby, Denmark

[21] Appl. No.: 745,049

[22] Filed: Nov. 7, 1996

Related U.S. Application Data

[63] Continuation-in-part of Ser. No. 455,971, May 31, 1995, abandoned.

[30] Foreign Application Priority Data

May 31, 1994 [FI] Finland ..................................... 942536

[51] Int. Cl.$^6$ .............................. B01J 31/00; B01J 37/00; C08F 4/02; C08F 4/60
[52] U.S. Cl. .......................... 502/125; 502/120; 502/126; 526/139
[58] Field of Search .................................... 502/120, 125, 502/126

[56] References Cited

U.S. PATENT DOCUMENTS

| | | | |
|---|---|---|---|
| 4,246,383 | 1/1981 | Gessell ...................................... | 526/92 |
| 4,400,303 | 8/1983 | Martin ...................................... | 526/125 |
| 4,701,505 | 10/1987 | Fujii et al. .............................. | 502/126 |
| 4,762,898 | 8/1988 | Matsuura et al. ........................ | 526/125 |
| 4,829,034 | 5/1989 | Iiskolan et al. ........................... | 502/125 |
| 4,927,797 | 5/1990 | Ewen ...................................... | 502/125 |
| 4,971,937 | 11/1990 | Albizzati et al. ........................ | 502/126 |
| 4,981,930 | 1/1991 | Funabashi et al. ...................... | 502/126 |
| 5,135,899 | 8/1992 | Garoff et al. ............................ | 502/125 |
| 5,147,839 | 9/1992 | Fujital et al. ............................ | 502/126 |
| 5,177,043 | 1/1993 | Koyama et al. ......................... | 502/125 |
| 5,234,879 | 8/1993 | Garoff et al. ............................ | 502/125 |
| 5,496,783 | 3/1996 | Chauvin et al. ......................... | 502/125 |
| 5,556,822 | 9/1996 | Jung et al. ............................... | 502/125 |

FOREIGN PATENT DOCUMENTS

| | | |
|---|---|---|
| 0086472 | 8/1983 | European Pat. Off. . |
| 0261961 | 3/1988 | European Pat. Off. . |
| 0273694 | 7/1988 | European Pat. Off. . |
| 0 045 975 | 4/1989 | European Pat. Off. . |
| 0 362 705 | 4/1990 | European Pat. Off. . |
| 0385765 | 9/1990 | European Pat. Off. . |
| 0449302 | 10/1991 | European Pat. Off. . |
| 0452916 | 10/1991 | European Pat. Off. . |
| 0546192 | 6/1993 | European Pat. Off. . |
| 0627449 | 12/1994 | European Pat. Off. . |
| 0728724 | 8/1996 | European Pat. Off. . |
| 0231878 | 8/1997 | European Pat. Off. . |
| 894627 | 3/1990 | Finland . |
| 85710 | 5/1992 | Finland . |
| 63-105007 | 5/1988 | Japan . |

OTHER PUBLICATIONS

Chemical Abstracts Index, No. 18231–08–8.
Chemical Abstracts Index, No. 129228–26–8.

*Primary Examiner*—Mark L. Bell
*Assistant Examiner*—J. Pasterczyk
*Attorney, Agent, or Firm*—Birch, Stewart, Kolasch & Birch, LLP

[57] ABSTRACT

Olefins or mixtures of olefins, particularly propene or mixtures of propene advantageously with ethene, can be polymerized using a Ziegler-Natta catalyst system containing, besides a transition-metal-based procatalyst and cocatalyst which is an organometallic compound, a compound particularly suited for controlling the stereospecificity of the produced polymer. Such a compound called an external donor may also have other effects. By using an acetal derivative of an aldehyde that has two ether groups for this purpose, advantageously selected from the group of dialkoxyphenylalkanes, e.g., dimethoxyphenylpropane, a good stereospecificity of the product is attained combined with the high hydrogen sensitivity of the catalyst system, whereby the use of hydrogen as the chain transfer agent offers an easy control method of the molecular weight of the product by means of adjusting the amount of hydrogen available in the polymerization reaction. The acetal derivative is a compound according to formula (III):

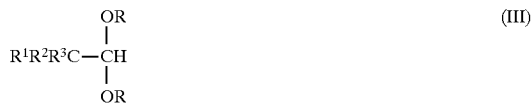

wherein R is $C_{1-4}$ alkyl group, $R^1$ and $R^2$ are the same or different and each is a hydrocarbon group or a group which can together form a ring, $R^3$ is hydrogen or a hydrocarbon group. If with the acetal derivative donor is used a clearly less hydrogen sensitive donor, e.g., alkoxysilanes, much broader MWD's of the product are achieved.

16 Claims, No Drawings

STEREOSPECIFIC CATALYST SYSTEM FOR POLYMERIZATION OF OLEFINS

The present application is a continuation-in-part of U.S. patent application Ser. No. 08/455,971, filed on May 31, 1995, now abandoned and which is incorporated herein by reference in its entirety.

FIELD OF THE INVENTION

The present invention relates to a catalyst system suited for the polymerization of olefins, said system comprising at least a procatalyst based on a titanium compound, an organoaluminium cocatalyst and at least one diether compound which is an acetal derivative of an aldehyde and optionally at least another electron donor compound.

BACKGROUND OF THE INVENTION

Olefins are conventionally polymerized using a Ziegler-Natta catalyst system comprising a procatalyst and a cocatalyst as its essential components. The procatalyst is formed by a transition metal compound of subgroups 4–8 of the periodic system of elements (Hubbard, IUPAC 1970). The cocatalyst is formed by an organic compound of a metal of major groups 1–3 of the periodic system of elements.

The transition metal conventionally is a titanium, zirconium, or vanadium compound, advantageously a titanium compound, and in fact, titanium has been found a particularly advantageous transition metal. Said compounds typically are halides or oxyhalides, or alternatively, organic compounds, conventionally alkoxides, alcoholates or haloalkoxides. Other kinds of organic compounds are less frequently used, while not necessarily unknown in the art. The transition metal compound can be expressed in the form of the following generalized formula:

$$(R'O)_n R''_m MX_{p-n-m} \qquad (I)$$

where M is a transition metal of subgroups 4–8, advantageously Ti, Zr or V, while R' and R" represent the similar or dissimilar organic groups chiefly having a backbone of 1–20 carbons, M is a transition metal and X is a halogen, advantageously chlorine. Advantageously and commonly, R' and R" are simply a hydrocarbon group, advantageously an alkyl group. p is the oxidization state of the metal M, commonly p is 4 or 5. n and m are an integer in the range 0–p.

The most advantageous compounds are selected from the group consisting of titanium alkoxides, halides and haloalkoxides, in particular when the halogen is chlorine. Accordingly, suitable compounds include titanium tetramethoxide, tetraethoxide, tetrapropoxides, tetrabutoxides and similar oxides, corresponding titanium alkoxyhalides in which 1–3 alkoxide groups are replaced by a halogen, chlorine in particular, and titanium halides, $TiBr_4$ and $TiCl_4$ in particular. The most commonly used of these compounds is $TiCl_4$. Obviously, two or a greater number of transition metal compounds can be used in the form of different mixtures.

The cocatalyst most commonly consists of an organic compound of a metal of major groups 1–3. While usually an aluminum compound is employed, also boron, zinc and alkali metal compounds have been used. An aluminium compound can be written using the formula (II) as:

$$R_n AlX_{3-n} \qquad (II)$$

where R is an organic hydrocarbon group, advantageously a $C_1$–$C_{20}$ alkyl, X is a halogen and n is an integer in the range of 1–3. Different kinds of cocatalyst can be used simultaneously in the form of various mixtures.

Additionally, a catalyst system contains components having catalyst improving and modifying characteristics. The procatalyst can be prepared on a more or less inert support, whereby the procatalyst component may be in solid state even if the transition metal compound as such is not in solid form. The procatalyst can be complexed with a so-called internal donor compound capable of electron donation so as to improve the stereospecificity and/or activity of the catalyst system. The preparation of the procatalyst can be implemented using an auxiliary component which may be a dissolving or slurrying medium and from which a portion is possibly complexed with the procatalyst composition. Such a compound may also act as an electron donor. Also the cocatalyst feed, which typically takes place separately from the procatalyst composition not earlier than to the polymerization process, can be complemented with the electron donor compound with a particular goal of improving the stereospecificity of the end product. Then, the electron donor is called an external donor.

To achieve a heterogenic, solid-state procatalyst composition, a separate support compound is required provided that the transition metal compound of the procatalyst is not one itself. The latter case is true for the transition metal compounds listed above. Widely varied types of solid inorganic or organic compounds can be used as the support. Typical of these are oxides of silicon, aluminium, titanium, magnesium, chromium, thorium or zirconium or mixtures of these oxides, salts of different inorganic acids such as salts of the said metals or earth alkali or earth metals including magnesium silicate and calcium silicate, calcium chloride, calcium sulfate, etc. (cf., e.g., FI patent publication 85,710). Important compounds as supports have been found from magnesium compounds including, e.g., alkoxides, hydroxides, hydroxyhalogenides and halogenides, of which the latter ones, particularly magnesium dichloride is an extremely important support for procatalyst compositions. Supports are typically subjected to different treatments before their use, whereby they can be heat-treated by, e.g., calcining; they can be chemically treated to remove so-called surface hydroxyl groups; they can be mechanically treated by, e.g., grinding in a ball mill or spray mill (cf., e.g., FI Pat. No. 882,626). An important support group is formed by magnesium halides, particularly $MgCl_2$, which can be advantageously complexed with alcohols, whereby the complexed support can be brought to a morphologically advantageous form by crystallization and/or solidification from an emulsion by a spray-drying technique or from a melt by a spray-crystallization technique (cf., e.g., FI Pat. No. 862, 459). Above all, organic supports comprise different polymers either in native form or modified. Of such supports worth mentioning are different polyolefins (polymers made from ethene, propene and other olefins), as well as different polymers of aromatic olefinic compounds (PS, ABS, etc.).

If the olefin monomers being polymerized can assume different spatial configurations when bonding to polymer molecule being formed, this formation generally requires a particular controlling compound capable of complexing the procatalyst so that the new monomer unit being joined to the polymer chain can principally adopt a certain position only. Owing to their manner of bonding to the procatalyst, such compounds are called electron donors, or simply donors. The donor may also render other properties besides the above-mentioned stereospecificity; for instance, the donor may improve the catalyst activity by increasing the bonding rate of the monomer units to the polymer molecule. Such a donor which is incorporated by complexing in the procatalyst already during its preparation is called an internal donor. These donors include a plurality of alcohols, ketones, aldehydes, carboxylic acids, derivatives of carboxylic acids such as esters, anhydrides, halides, as well as different ethers, silanes, siloxanes, etc. Simultaneous use of several donors is also possible. Advantageous compounds in this respect have been found to be, e.g., mono- and diesters of aromatic carboxylic acids and aliphatic alcohols, whose simultaneous use facilitates exchange esterification in conjunction with the use of a donor compound (cf. FI Pat. No. 906,282).

A stereospecificity-controlling compound which is fed into the polymerization reactor only in conjunction with the cocatalyst is called an external donor. Such donors are often the same compounds as those employed as internal donors, while in many cases the external donor in a single polymerization reaction advantageously should not be the same compound as the internal donor, because then the unlike properties of the different compounds can be exploited particularly if the combination of different donors amplifies the effect of their properties and if they have synergistic coeffects. Hence, finding a suitable optimum of such coeffects is the primary goal in the selection of different donors. Advantageous external donors are, e.g., different silane and ether compounds. Particularly alkoxysilanes (cf., e.g., EP Pat. No. 231,878 and EP Pat. No. 261,961) and different linear and cyclic ethers, e.g., trimethyl-methoxyether, dimethoxypropane (cf. EP Pat. No. 449,302) and cineol (cf. Fl Pat. No. 932,580). Also nitrogen-containing heterocyclic compounds have been used such as tetramethylpiperidine (cf. JP Pat. No. 63,105,007).

During the polymerization process, the number of monomer units joining to a polymer molecule may vary from a few units to millions of units. Conventionally, the molecular weight of a commercial-grade solid polyolefin is in the range of 10,000–1,000,000 g/mol. If the degree of polymerization remains lower, the product is a soft and plastic wax or paste-like plastisol, even a viscous liquid which may find use in special applications. A degree of polymerization exceeding one million is difficult to attain, and moreover, such a polymer often is too hard for most applications or too difficult to process. Thus, the molecular weight control of the polymer has an important role, which can be accomplished by means of so-called chain-length controlling agents. Conventionally, the chain-controlling agent added to the polymerization reaction is hydrogen whose benefit is not to introduce any undesirable group in the molecule. If the hydrogen addition is capable of controlling the molecular weight of the produced polymer, the polymerization catalyst is said to be hydrogen sensitive. Different catalyst systems also have different hydrogen sensitivities, whereby different amounts of hydrogen will be required to polymers having the same melt flow rate. On the other hand, hydrogen addition elevates the polymerization activity of the catalyst.

Polymerization can be carried out in gas phase, whereby either gaseous monomer or an inert gas or a mixture thereof is fed to the reactor so that the entering gas keeps the growing polymer in the form of particles on which the growth of the polymer molecules takes place. The reaction temperature is so high that even the monomers are vaporized that are liquid under normal conditions. In a continuous polymerization process the polymer particles are removed continuously from the reactor, and the monomer or monomer mixture feed is continuous. Alternatively, the reaction products removal and precursor feed may also be intermittent. The polymer particle layer which advantageously is kept in a fluidized state can be stirred by mechanical agitation. A great number of different agitator means and agitation systems are available. Gas-phase polymerization is often carried out in a circulating fluidized-bed reactor in which the solid particles form a bed maintained in fluidized state by the upward directed flow of the gaseous feed medium. The fluidized bed may also be formed by inert solids comprised of most varied inorganic and organic compounds.

If liquid-phase polymerization is desired, a medium is required that is liquid at the polymerization temperature, whereby said medium may comprise a single polymer or a greater number of polymers (usually referred to as bulk polymerization), or a separate solvent or diluting agent capable of dissolving or slurrying the monomer or/and the polymer. Where such slurrying involves the formation of a suspension or a slurry, the polymerization process is named respectively. Here, the medium may then be a hydrocarbon solvent particularly including alkanes and cycloalkanes such as propane, butane, isobutane, pentane, hexane, heptane, cyclohexane, etc., which are commonly used. The formation and stability of the slurry may be improved by mechanical agitation, whereby suspending agents called suspenders and colloid stabilizing agents must often be added. The polymerization reactor may be a conventional mixing vessel reactor complemented with widely varying additional arrangements, or alternatively, a loop- or ring-type tubular reactor in which the polymer slurry is circulated by means of different feed, end product removal and agitating arrangements. When the polymerization is carried out in a medium to produce a polymer with a high MFR, catalyst systems of low hydrogen sensitivity may involve problems in the addition of required amount of hydrogen, because only a certain maximum concentration of oxygen can be dissolved in the medium.

Molecular weight distribution (MWD) of polyolefin produced using a high yield Ziegler-Natta catalyst system comprising a titanium-compound-containing procatalyst and an organoaluminium cocatalyst is typically relatively narrow. Polydispersity (Mw/Mn) of polypropylene produced by continuous polymerization reactor with the above mentioned catalyst system is typically about 4–5. When the MWD is broadened, e.g., increasing the polydispersity to 6–8, stiffness of polypropylene can be increased. However, simultaneously impact strength usually decreases. In addition to effect on mechanical properties, broadness of MWD influences on the processability of the polymer. When the increase in stiffness and better processability obtained with fabrication processes using extrusion techniques are combined, it is possible to produce products with markedly higher output and at least similar stiffness.

The broadness of MWD is measured most usually by gel permeation chromatography (GPC), which gives the polydispersity (Mw/Mn). Another relatively common method is based on the effects of MWD on rheological properties. Measuring the shear thinning or elasticity of molten polymer samples, e.g. Shear Thinning Index (SHII) or Elasticity Index, gives good information on broadness of MWD. Broadened MWD increases usually both elasticity and shear thinning of polymer melts.

The most common industrial method to broaden the MWD of polyolefins in continuous polymerization reactors is to produce the polymer in two reactors connected in series, and the polymers produced in each reactor should have clearly different molecular weight. However, it is not always possible or feasible to use two reactors in series to broaden the MWD. According to patent application EP 452916 Al (Idemitsu Petrochemicals KK) MWD of polypropylene can be broadened by using a special type of alkoxysilane as an external donor. In a patent application of Mitsui Petrochemical Ind. Ltd., EP 385765 A2 the MDW of polypropylene is broadened by using a catalyst system having a 1:1 mixture of two different alkoxysilanes as an external donor.

SUMMARY OF THE INVENTION

Now it has been unexpectedly found that when polymerizing olefins using a Ziegler-Natta catalyst system comprising a titanium-compound-containing procatalyst and an organoaluminium cocatalyst, the polymerization reaction can be complemented, besides the monomers, procatalyst and cocatalyst, with a compound capable of improving the stereospecificity of the resulting polymer product, said compound containing two ether groups and said compound being an acetal derivative of an aldehyde which can be written according to formula III below

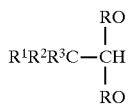

$$R^1R^2R^3C-\overset{\overset{\displaystyle RO}{|}}{\underset{\underset{\displaystyle RO}{|}}{CH}} \quad (III)$$

where R is a lower alkyl group, preferably $C_{1-4}$ alkyl, $R^1$ and $R^2$ are similar or dissimilar hydrocarbon groups or groups forming together a ring, $R^3$ is a hydrogen or hydrocarbon group.

In addition to acting as a stereospecificity controlling agent, said compound makes the polymerization reaction extremely hydrogen sensitive, that is, the molecular weight of the produced polymer can be controlled in an improved manner over prior-art techniques by adjusting the amount of hydrogen added to the reaction and particularly makes it possible to produce a polymer with a low molecular weight which gives a high melt flow rate MFR. Table 1 gives a list of external donors according to the present invention and reference compounds used as external donors in the prior art by their chemical name, abbreviation, chemical composition and molecular structure.

Now it has also been found that, when polymerizing olefins using a high yield Ziegler-Natta catalyst system and an external donor a mixture of at least one acetal derivative of formula III and at least one clearly less hydrogen sensitive external donor, a broader MWD is obtained compared to using the donor components separately. Clearly less hydrogen sensitive compounds than acetal derivatives used as external donors in Ziegler-Natta catalyst systems are, e.g., many alkoxysilane compounds. Especially symmetric dimethoxysilanes, such as dicyclopentyldimethoxysilane, dicyclohexyldimethoxysilane, di-isopropyldimethoxysilane, di-isobutyldimethoxysilane, di-t-butyl-dimethoxysilane or diphenyldimethoxysilane can be used. Dicyclopentyldimethoxysilane can be considered as a representative example of all the symmetric dimethoxysilanes, because silane compounds that have resembling performance in polymerization are characterized by two methoxy groups and two similar cyclic or branched aliphatic hydrocarbons or two aromatic hydrocarbon groups connected to the silicon atom.

The mole ratios of the acetal compounds and the less hydrogen sensitive donor compounds are not limited. However, it has been unexpectedly found that broader MWD can be obtained already with small addition of, e.g., dicyclopentyldimethoxysilane to acetal derivative used as external donor. It means that the amount of the acetal derivative can be a clear majority (80 . . . 98 mol %) of the donor mixture, but significant effects on MWD is observed.

Addition of the symmetric dimethoxysilane to the acetal derivative used as external donor is also an effective method to further increase the isotacticity of polypropylene produced using the Ziegler-Natta catalyst system. This increase in isotacticity combined with the broader MWD obtained is especially beneficial for the stiffness of the polypropylene material.

In the context of the present invention, olefin refers to a hydrocarbon containing at least one carbon-carbon double bond. Such compounds particularly comprise different alkenes such as linear monoalkenes including ethene, propene, butenes, pentenes, etc. The olefins may also be compounds branched with a hydrocarbon group, of which a simple example is 4-methyl-1-pentene.

When polymerizing olefins, one or a greater number of the above-mentioned compounds can be used in the reaction. Herein, particularly important compounds are the homo- and copolymers of propene.

Almost all asymmetric unsaturated hydrocarbons (of conventional monoolefins only ethene is symmetric) form spatially isomeric polymer molecules. For monoolefins the stereospecificity is determined by the tacticity of the polymer so that if the subsequent units being added to the growing polymer chain always assume a similar position with regard to the double bond, an isotactic polymer is formed, and if the subsequent units always assume a position opposite to that of the preceding unit, a syndiotactic polymer is formed, and if the subsequent units assume a random position, an atactic polymer is formed. Of these, any form may find optimum use in a certain application as the polymer properties may also be controlled by its type of tacticity. For normal applications, the isotactic form is the most desirable. Its degree of crystallization is highest, it has high mechanical strength, is also otherwise most durable and is not sticky. When the crystallinity of polypropene is desired to be lowered, the propene can be copolymerized with ethene, whereby such copolymer is suited for applications requiring transparency, high impact resistance or good seaming capability.

Both homo- and copolymers find use in, e.g., films, sheets, pipes and varied injection-molded objects for different applications particularly in the automotive industry and domestic consumption.

DETAILED DESCRIPTION OF THE INVENTION

The following Examples are provided as an aid to those desiring to practice the present invention. These Examples are, however, not to be construed as limiting to the claimed invention, since those of ordinary skill in the art will realize that various modifications can be made thereto without departing from the spirit or scope of the present inventive discovery.

EXAMPLES

To exemplify the function of the invention, tests on the homo- and copolymerization of propene and ethene were carried out using three different procatalyst compositions.

Procatalyst A was prepared according to FI Pat. No. 862,459 as follows: 90 kg spray crystallized $MgCl_2.3EtOH$ support was mixed under inert conditions with 300 l of a hydrocarbon having a boiling point of 100° C. The obtained slurry was cooled to −15° C. 600 l cooled $TiCl_4$ was added, and the temperature was slowly elevated to +20° C. 21.8 kg dioctylphthalate (DOP) was added to act as an internal donor. The temperature was elevated to 130° C., and after half an hour the liquid phase was removed by filtering. Next, 600 l TiCl$_4$ was added. The mixture was kept for 1 h at 120° C., after which the procatalyst was washed three times with a hot hydrocarbon. The procatalyst was dried in a nitrogen flow at 70° C. The obtained catalyst composition was analyzed as: Ti 2.5 wt-%, Mg 13.8 wt-%, DOP 0.02 wt-%, diethylphthalate (DEP) 7.9 wt-% and chlorine 48 wt-%.

Procatalyst B was prepared essentially according to Fl patent publication 70,028 or EP patent publication 86,472. The support of the catalyst was MgCl$_2$, the internal donor was dialkylphthalate and the transition metal compound was TiCl$_4$.

Procatalyst C was prepared as procatalyst A with the exception that the amount of added donor was reduced and the temperature during the first activation phase was kept for 60 min at 125° C. The obtained catalyst composition was analyzed as: Ti 2.6 wt-%, Mg 15.9 wt-%, DOP 0.3 wt-%, DEP 5.2 wt-% and chlorine 54 wt-%.

Homopolymerization of propene was carried out under bulk conditions with the help of procatalysts A, B and C, respectively, as follows:

A carefully cleaned 5 l steel reactor vessel was evacuated, then heated to 80° C., and after cooling to 30° C., was purged with nitrogen and propene. Approx. 20 mg procatalyst (for exact amounts, see Table 2) and the cocatalyst (triethyl aluminium, TEA) were reacted so that the mole ratio Al/Ti was 500 in conjunction with the external donor given in Table 2 so that the mole ratio Al/D was as expressed in Table 2. The external donor was an acetal compound or a mixture of an acetal compound and dicyclopentyldimethoxysilane (DCPDMS) in accordance with the invention, while the comparative external donor was cyclohexylmethyldimethoxysilane (CHMMS), or DCPDMS alone or alternatively, 2,4-dimethyl-3,3-dimethoxypentane (DID12). The mixture of the cocatalyst and the donor was diluted with heptane to 30 ml. A 15 ml aliquot of this solution was fed to the reactor. The procatalyst was added in conjunction with the rest of the solution to the reactor. Next, 71 mmol hydrogen and 1400 g propene were charged in the reactor if not other mentioned in Table 3. The polymerization reaction was carried out for 1 h at 70° C.

The isotacticity of the obtained polymer was determined by heptane extraction and the melt flow rate MFR, also called the melt index, was determined by measuring the melt flow rate according to the standard method defined in ASTM D 1238.

The polymerization test results are given in Table 2 and Table 3. Different H$_2$ concentrations were used in order to study the hydrogen sensitivity. The results of this table can be interpreted, e.g., as follows:

Example 11 indicates that a very low degree of isotacticity results in a relatively high melt flow rate, while when the isotacticity is above 95%, the most important factor affecting the melt flow rate is the molecular weight. A further teaching of the comparative example 11 is that acetal derivatives of ketones, that is, ketales perform extremely badly as donors under the given polymerization conditions in comparison with the corresponding aldehyde derivatives. The examples also show that the higher the hydrogen sensitivity, that is, the lower the molecular weight of the polymer achieved by a certain procatalyst composition, the higher the melt flow rate. This can be seen by comparing examples 3, 5 and 7 with comparative examples 12, 13 and 14.

Table 3 shows the polymerization results of the donor mixture of acetal and less hydrogen sensitive symmetric dimethoxysilane. The examples 15 to 18 show that addition of the silane compound to the acetal gives broadened molecular weight distribution and higher isotacticity compared to acetal alone.

The copolymerization of propene and ethene was performed in gas phase using a 2 l reactor vessel which prior to the polymerization was heated to 90° C., evacuated and purged with nitrogen. Polymerization was carried out at 70° C. To the procatalyst (30 mg) mentioned in Table 4 was added cocatalyst (triethyl aluminium, in Examples 18 and 19, for instance, or triisobutyl aluminium in Examples 21 and 22, for instance) so that the mole ratio Al/Ti was 200 and using the external donor given in Table 4 so that the mole ratio Al/D was 10. After reacting the components for 5 min, the catalyst slurry was charged to the reactor. A flow rate meter was used to monitor the monomer feed rates of gaseous propene and ethene, and thus the ratio of the monomer feeds was kept constant so that the molar concentration of ethene was 7.4 mol-% (Examples 19 and 20), or alternatively, 3.8 mol-% (Examples 21 and 22), while the reactor pressure was at 7 bar. The reaction was allowed to run for 1.5 h.

The test results are given in Table 4, in which Examples 20 and 21 are carried out in accordance with the invention, while Examples 19 and 22 are comparative examples. The ethene content of the resulting polymer was measured using FTIR techniques.

Additional Examples 23 and 24 were also carried out wherein polymerizations were carried out in the same conditions as in Examples 1 to 10 using the same procatalyst A, except that 2-ethyl-1,1-diethoxy butane (EDEB) and 2-ethyl-1,1-diethoxy hexane (EDEH) were used as the external donor with Al/D=5 (mole/mole). The results are shown in Table 5.

TABLE 1

External donor compounds.

| Chemical name | Abbreviation | Chemical composition | Molecular structure |
| --- | --- | --- | --- |
| 2-phenyl-1,1-dimethoxypropane | FPADMA | C$_{11}$H$_{17}$O$_2$ | CH$_2$CH$_2$CH(OCH$_3$)$_2$–phenyl |

TABLE 1-continued

External donor compounds.

| Chemical name | Abbreviation | Chemical composition | Molecular structure |
|---|---|---|---|
| Cyclohexyl-dimethoxymethane | SKD2 | $C_9H_{18}O_2$ | 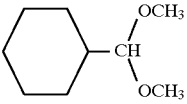 |
| 2-ethyl-1,1-dimethoxybutane | EBD2 | $C_8H_{18}O_2$ | 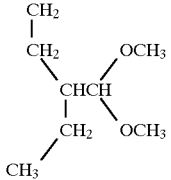 |
| 2-ethyl-1,1-dimethoxyhexane | EKD5 | $C_{10}H_{22}O_2$ | 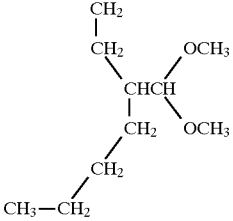 |
| 3-methyl-5-dimethyl-1,1-dimethoxyhexane | TMHD2 | $C_{11}H_{24}O_2$ | 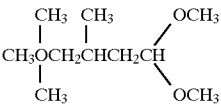 |
| 2-methyl-1,1-dimethoxypentane | MVD2 | $C_8H_{18}O_2$ | 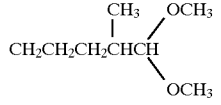 |
| 3-methyl-1,1-dimethoxybutane | IVD3 | $C_7H_{16}O_2$ | 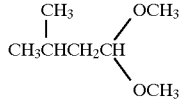 |

Comparative donors

| | | | |
|---|---|---|---|
| 2,4-dimethyl-3,3 dimethoxypentane | DID12 | $C_{10}H_{20}O_2$ | 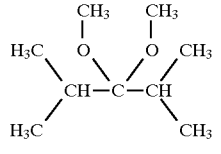 |
| Cyclohexylmethyl-dimethoxysilane | CHMMS | $C_9H_{20}O_2Si$ | 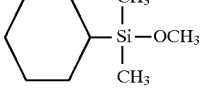 |

TABLE 2

Polymerization test results.

| Example no. | Pro-catalyst | External donor | Procat. charge [mg] | Aluminium/donor [mol/mol] | Activity [kgPP/g cat.] | Isotacticity index [%] | MFR [g/10 min @ 2.16 kg] |
|---|---|---|---|---|---|---|---|
| 1 | A | FPADMA | 20.6 | 10 | 31.7 | 89.7 | 16.1 |
| 2 | A | SKD2 | 19.8 | 10 | 30.7 | 92.7 | 12.3 |
| 3 | A | SKD2 | 22.8 | 5 | 23.4 | 95.2 | 10.8 |
| 4 | A | EBD2 | 19.9 | 10 | 36.7 | 94.1 | 13.4 |
| 5 | A | EBD2 | 22.6 | 5 | 26.7 | 96.2 | 12.6 |

TABLE 2-continued

Polymerization test results.

| Example no. | Pro- cata- lyst | External donor | Procat. charge [mg] | Aluminium/ donor [mol/mol] | Activity [kgPP/g cat.] | Isotacticity index [%] | MFR [g/10 min @ 2.16 kg] |
|---|---|---|---|---|---|---|---|
| 6 | A | EKD5 | 20.9 | 10 | 34.5 | 93.7 | 17.5 |
| 7 | A | EKD5 | 22.2 | 5 | 34.5 | 95.5 | 15.0 |
| 8 | A | TMHD2 | 19.1 | 10 | 24.8 | <85 | 31 |
| 9 | A | MVD2 | 21.9 | 10 | 27.8 | 87.6 | 22.5 |
| 10 | A | IVD3 | 21.3 | 10 | 19.9 | 88.3 | 11.5 |
| Comparative examples | | | | | | | |
| 11 | A | DID12 | 21.8 | 10 | 21.9 | 73.3 | 25.7 |
| 12 | A | CHMMS | 22.1 | 20 | 32.5 | 98.5 | 3.8 |
| 13 | B | CHMMS | 21.0 | 20 | 31.1 | 97.2 | 6.6 |
| 14 | C | CHMMS | 23.4 | 20 | 24.0 | 95.8 | 5.8 |

TABLE 3

Polymerization test results.

| Example no. | Pro- cata- lyst | External doors | Donor*- ratio | Procat. charge [mg] | Aluminum/ donor [mol/mol] | Hydrogen charge [mmol] | Activity [kg PP/g kat.] | FTIR** isot. ind. [%] | MFR [g/10 min.] | Mw/Mn | SHI1*** |
|---|---|---|---|---|---|---|---|---|---|---|---|
| 15 | A | EKD5 + DCPDMS | 95/5 | 22.0 | 5 | 220 | 22.5 | 96.1 | 16.9 | 7.1 | 14 |
| 16 | A | EKD5 + DCPDMS | 85/15 | 21.2 | 5 | 220 | 24 | 98.2 | 10.1 | nd | 17 |
| Comparative examples | | | | | | | | | | | |
| 17 | A | EKD5 | | 20.5 | 5 | 110 | 33.9 | 90.5 | 20 | 4.4 | 8.1 |
| 18 | A | DCPDMS | | 20.8 | 4 | 110 | 22.9 | 99.1 | 2.7 | 6 | 15 |

*EKD5/DCPDMS mole ratio
**isotacticity determined with FTIR
***SHI1 = Shear Thinning Index, $\eta_0/\eta^*$ (50000 Pa)

TABLE 4

Copolymerization of propene and ethene.

| Example No. | Procatalyst | External Donor | Activity [kg PP/g cat.] | MFR [g/10] | Ethene Content [wt-%] |
|---|---|---|---|---|---|
| 19 | B | CHMMS | 3.9 | 11 | 6.9 |
| 20 | B | FPADMA | 1.7 | 19 | 6.1 |
| 21 | A | FPADMA | 3.6 | 4.4 | 2.7 |
| 22 | A | CHMMS | 3.3 | 2.0 | 2.1 |

TABLE 5

| Example No. | External Donor | Activity kgPP/gCat | MRF$_{2.16}$ g/10 min | Isotactic Index % |
|---|---|---|---|---|
| 23 | EDEB | 25.5 | 25.6 | 93.7 |
| 24 | EDEH | 26.3 | 32.6 | 91.3 |

We claim:

1. A catalyst composition for polymerization of olefins, comprising a procatalyst composition comprised of a titanium compound, an organoaluminium cocatalyst and at least a first and a second external electron donor, wherein said first external electron donor is an acetal derivative of an aldehyde, wherein said acetal derivative is a compound according to formula (III):

wherein
R is a $C_{1-4}$ alkyl group;
$R^1$ is a hydrogen atom or a hydrocarbon group and $R^2$ is a hydrocarbon group or $R^1$ and $R^2$ can together form a hydrocarbon ring; and
$R^3$ is hydrogen or a hydrocarbon group, and wherein said second external electron donor is less hydrogen sensitive than said acetal derivative.

2. The catalyst composition as defined in claim 1, wherein R is a methyl group.

3. The catalyst composition as defined in claim 1, wherein the second external electron donor is dicyclopentyldimethoxysilane, dicyclohexyldimethoxysilane, di-isobutyldimethoxysilane, di-isopropyldimethioxysilane or diphenyldimethoxysilane.

4. The catalyst composition as defined in claim 1, wherein the second external electron donor is an alkoxysilane.

5. The catalyst composition as defined in claim 1 or 2, wherein $R^1$ and $R^2$ form together a cyclohexyl group.

6. The catalyst composition as defined in claim 1 or 2, wherein $R^1$ is a methyl or ethyl group and $R^2$ is an aliphatic $C_2$–$C_4$ alkyl group.

7. The catalyst composition as defined in claim 1 or 2, wherein $R^1$ is hydrogen and $R^2$ is a branched alkyl group.

8. The catalyst composition as defined in claim 1, wherein the procatalyst composition contains magnesium dihalide in active form on which is deposited a titanium halide or oxyhalide and said first and second external electron donor compounds.

9. The catalyst composition as defined in claim 1, wherein the organoaluminium cocatalyst is a trialkyl aluminum cocatalyst.

10. The catalyst composition as defined in claim 4, wherein said alkoxysilane is a symmetric dimethoxysilane.

11. The catalyst composition as defined in claim 1, wherein the amount of the acetal derivative in the mixture of acetal derivative and the second external electron donor is 70 to 99 mol-% based on the total moles of the acetal derivative and the second electron donor.

12. The catalyst composition as defined in claim 11, wherein the amount of the acetal derivative in the mixture of acetal derivative and the second external electron donor is 85 to 95 mol-% based on the total moles of the acetal derivative and the second electron donor.

13. The catalyst composition as defined in claim 9, wherein said trialkyl aluminum cocatalyst is triethyl aluminum or triisobutyl aluminum.

14. The catalyst composition as defined in claim 8, wherein said titanium halide is $TiCl_4$.

15. A catalyst composition for polymerization of olefins, comprising a procatalyst composition comprised of a titanium compound, an organoaluminium cocatalyst and at least one external electron donor, wherein at least one of said external electron donor(s) is an acetal derivative of an aldehyde, wherein the acetal derivative is a 2-phenylpropionaldehydedimethylacetal.

16. The catalyst composition as defined in claim 15, wherein the acetal derivative is 1,1-dimethoxy-2-phenylpropane.

* * * * *